Dec. 12, 1967  J. CLEGG  3,357,439
CONVEYORS FOR STRIP MATERIAL
Filed June 10, 1965  5 Sheets-Sheet 1

INVENTOR
JOSEPH CLEGG
BY
WATSON, COLE, GRINDLE & WATSON
ATTORNEYS

INVENTOR
JOSEPH CLEGG
BY
WATSON, COLE, GRINDLE & WATSON
ATTORNEYS

United States Patent Office 3,357,439
Patented Dec. 12, 1967

3,357,439
CONVEYORS FOR STRIP MATERIAL
Joseph Clegg, Dagenham Dock, Essex, England, assignor to Porous Plastics Limited, Essex, England, a company of Great Britain
Filed June 10, 1965, Ser. No. 462,891
Claims priority, application Great Britain, June 12, 1964, 24,575/64
14 Claims. (Cl. 134—60)

ABSTRACT OF THE DISCLOSURE

A conveyor for carrying weak buoyant strip material through a leaching bath has a straight lower conveyor immersed in the bath and the strip is fed to it at an angle. Brushes slidably mounted in slots on a chain conveyor are prevented by curved skid bars from engaging the strip until it is on the straight portion of the lower conveyor. The brushes then slide to the ends of slots in which they are mounted and hold the strip in contact with the lower conveyor.

---

This invention relates to conveyors for strip material.

The invention is primarily concerned with a conveyor for material in the form of a continuous strip but it may find application to a series of plates or pieces of strip material. For convenience, the term strip material will be employed herein to include such material where the context permits.

The apparatus conveniently includes a companion conveyor comprising an endless band of sheet material, an endless band of brushes having soft bristles opposed to the band conveyor to hold the strip material in contact with the endless band conveyor, and means for driving the two conveyors at the same linear speed to carry the material with them, in which the brushes are carried by supporting means of endless band form by connections permitting each brush to move independently away from the position of the strip material to a retracted position in response to pressure on the bristles, the brushes being biased towards the strip. This is important where it is required to avoid crinkling of the strip, since the velocity of the ends of the bristles may be greater where they are travelling round a curve than where they are travelling in a straight path.

The apparatus may include curved skid bars arranged to hold the brushes away from the strip as they travel in a curved path.

In one form of the invention the brushes are connected to supporting means such as chains by connections permitting each brush to move towards and away from the position of the strip in response to pressure on the bristles. The pressure of the bristles on the strips may be maintained by the provision of springs but conveniently where the portion of the strip engaged by the bristles is substantially horizontal gravity may be relied upon.

The invention is capable of many applications but in one particular application it is intended for exposing the strip material to a treating liquid and the conveyor passes through a bath of the liquid. In such a case the bristles can be made to exert gentle but firm pressure on the face of the strip, which may be mechanically weak, without interfering with the access of the liquid to the material of the strip.

Conveniently the strip is then supported by companion conveyor and the brush conveyor acts on its upper surface to hold it down into contact with the companion conveyor. In such a case the buoyancy of the liquid might tend to cause the strip to slip on the conveyor below, or even to float away from it, and this tendency is prevented by the bristle conveyor pressing it down.

Where the strip enters a bath it will normally have to pass from the downward sloping path to a horizontal path. Similarly where it leaves a bath it will normally have to pass from a horizontal path to an upward sloping path. Where, for this or any other reason, the companion conveyor deviates upwards (either from a downward path to a horizontal path or from a horizontal path to an upward path) it will have to pass under a transverse bar or other guide and means are preferably provided for temporarily separating the strip from the companion conveyor and causing it to pass over the guide.

In one such arrangement the companion conveyor band is passed over a guide and then under a lower guide so as to cause it to make a detour whilst the strip material can continue directly over the latter guide.

In an alternative arrangement the means for causing the strip material to pass over the guide comprises a stripper plate projecting between the strip material and the companion conveyor band to deflect the former away from the latter and over the guide.

The apparatus may include a series of two or more trays, each including a brush conveyor, through which the strip is arranged to pass successively in one order while the liquid passes through them in the reverse order. Such trays may be at different levels, the strip being arranged to travel from the lower tray to the higher tray while liquid flows down from the higher tray to the lower tray. Moreover the strip mateial and the liquid may be arranged to travel in opposite directions in an individual bath or tray. To render such an arrangement effective it may be desirable to provide at least one baffle extending across a bath or tray at an intermediate point below the liquid surface to prevent mixing of the liquid between the ends of the bath or tray due to the stirring action of the conveyor. Conveniently such a baffle extends upwards substantially to, or above, the liquid surface and the companion conveyor passes over the top of it.

In one arrangement the bath comprises a series of trays arranged one above the other, in which case the strip may follow a zig zag path through successive trays, being inverted between one and another.

Where the treating liquid undergoes an increase of density it may be desirable to provide at the outlet end of a tray a baffle extending across it from above the liquid surface but having at least one opening adjacent the bottom of the tray to allow the lower stratum only of the liquid to pass to the outlet.

The invention may be put into practice in various ways and applied to various purposes.

Two specific embodiments will be described by way of example as applied to part of an apparatus including a series of leaching trays for leaching a pore forming salt from a strip of material for use in a process for the manufacture of microporous battery separators. In the accompanying drawings—

Figure 1:
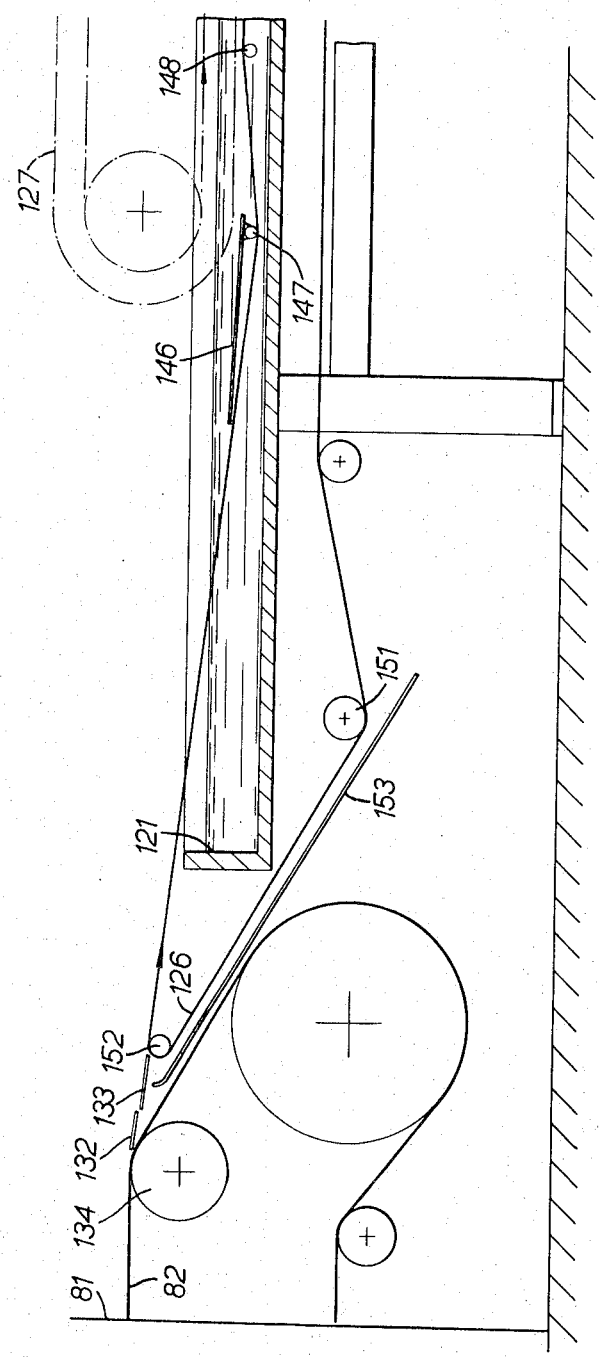
FIGURE 1 is a diagrammatic sectional side elevation showing the strip entering the first leaching tray.

Briefly, the process for manufacturing the strip material comprises mixing the granular separator forming material, which in this case is polyvinyl chloride, with a pore-forming salt and a solvent to form a dough. After thorough mixing the dough is de-aerated and then fed through a die to produce ribbed strip. The ribbed strip immediately passes into a solvent removal oven. From the solvent removal oven the strip passes into a leaching plant in which it is caused to travel through a number of shallow leaching tanks or trays to remove the pore-forming salt and thus form the pores. From the leaching plant the strip is fed continuously through a drying oven to remove the leaching liquid and from the drying oven it passes to a cutter which trims its edges and cuts it into short lengths suitable for individual separators. The solvent removal oven is provided with a solvent recovery unit and the leaching unit is provided with a pore-forming material recovery unit, and the cutter with a unit to recover the off-cuts in a re-usable form.

The process as a whole, and particularly the heating in the solvent removal oven, forms the subject of the present applicants' United States patent application Ser. No. 462,863, and it will be unnecessary to describe it in detail with the exception of the leaching plant forming the subject of the present invention.

The leaching plant shown in FIGURES 1 to 4 comprises a number of shallow tanks or trays 121, for example four each 80 ft. long, arranged end to end, through which the strip is passed successively. Each tray is at a slightly higher level than the previous tray, in the direction of travel of the strip, and water is pumped into the last tray by a metering pump (not shown) and passes from each tray to the previous one so as to flow in counter-current with the strip from the last tray to the first tray, whence the concentrated solution is delivered to the salt recovery plant in which it is evaporated to recover the ammonium sulphate. The leaching liquid is maintained at a temperature of about 90° C. by a heater, and exhaust fans are connected to the unit in order to exhaust any steam that may be evolved.

The material which is produced by the process described in the copending patent specification referred to above initially is extremely brittle and subsequently somewhat weak, and in addition it may tend to undergo certain changes of dimensions. Accordingly in each tray the strip is supported on a conveyor 126 of previous material such as woven Terylene R.T.M. (polyethylene terephthalate) or nylon fabric, which runs beneath the surface of the leaching liquid in the tray and returns from the exit end to the entry end underneath the tray. The preferred material is woven Terylene R.T.M.

Morover apart from the very initial stages of the leaching the material would tend to float so that throughout the leaching until almost the end it is desirable that it should be held firmly but gently in contact with the conveyor by which it is being fed forward. Accordingly it is desirable in each tray to provide means for pressing the strip down into contact with the conveyor beneath it. For this purpose each tray is provided with an upper conveyor 127. This must be such as not to damage the ribbed strip, and at the same time such as not to prevent access of the leaching liquid to all parts of its surface. To meet these requirements the upper conveyor consists of a pair of chains 128 between which extend a number of brushes 129 the bristles 131 of which rest upon the strip of material. The brushes are preferably spaced about three inches apart when dealing with strip material of the order of 0.15 inch thick. The brushes themselves are about 30 inches long. The consistency of the bristles is important and it has been found that polypropylene fibres are suitable and generally retain their resilience when wet and have a satisfactory life.

It will be appreciated that under less severe conditions other fibrous materials could be used, and particularly in dry conditions nylon and Terylene R.T.M. fibers may be used.

The upper and lower conveyors are provided with suitable driving means such as electric motors.

These motors are provided with electrical control means to match their speeds to each other, but trimming facilities are available to vary the speed of each independently. Thus the speeds of the two conveyors can be varied simultaneously and to any desired values, or as preferred in the particular use described herein the speeds can be kept the same and constant.

However when a material is being handled which is liable to shrinkage during the leaching process the upper conveyor can be run at a faster speed than the lower conveyor thus initially producing bunching of the material on the conveyor. The difference in speeds can be suitably adjusted to accommodate the particular degree of shrinkage occurring with different materials. Moreover when the upper and lower conveyors are running synchronously with the intention of preventing any bunching up of the strip occurring, the pressure of the bristles pressing the strip against the lower conveyor tends to prevent slipping of the lower conveyor beneath the strip at high conveyor speeds. Thus conveyor speeds of the order of twenty feet per minute can be attained without a significant amount of slip occurring between the strip and the lower conveyor.

As soon as the material leaves the solvent removal oven 81 and begins to cool it becomes extremely brittle. The outlet end of the conveyor 82 in the solvent removal oven is deflected downwards round a guide roller 134 as shown in FIGURE 1, at an angle of about 30° and a pair of overlapping skid plates 132 and 133 provided to transfer the strip to the lower conveyor 126 of the first tray of the leaching unit.

This portion of the conveyor, returning under the tray, passes under a roller 151 then slopes up close above the conveyor 82 to an end roller 152, whence it slopes down at a gentle angle (10° to 12° to the horizontal) into the first tray 121. A plate 153 is interposed between the conveyor bands 82 and 126 to prevent liquid from dripping from the latter on to the former, which will be hot.

One skid plate 132 is mounted by suitable means (not shown) to move with the guide roller 134 of the oven conveyor 82, whilst the other 133 is carried by the first leaching tray by suitable means (not shown), so that one can slide over the other to take up expansion. Thus the now brittle material is introduced to the first tray of the leaching unit without undue stress being applied to it. Here it is rapidly wetted and becomes flexible while remaining weak.

The lower conveyor 126 slopes down gently towards the bottom of the tray and passes under a transverse guide bar 147 before rising slightly to pass over the first of a number of support bars 148. It is undesirable that the strip material should pass under the guide bar 147 and to prevent this the guide bar carries a stripper plate 146. This is of roughly semicircular form with the ends cut off and its convex edge extends from the bar in one direction of the approaching strip to separate it from the conveyor band 126 and cause it to pass over the top of the guide bar 147.

Figure 2:
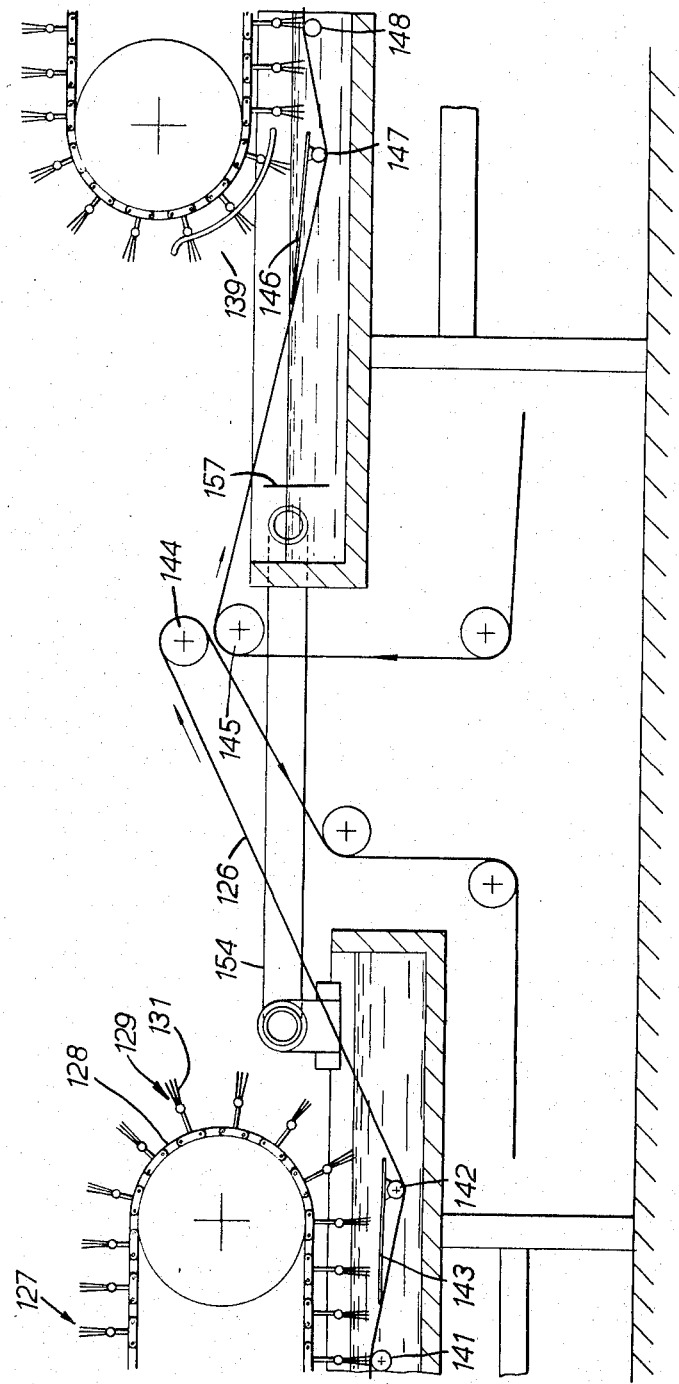
FIGURE 2 is a similar view showing the strip passing from one leaching tray to another.

Similarly at other points where the Terylene R.T.M. conveyor deviates from a downward path to a horizontal path or from a horizontal path to an upward path it has to pass under a roller or other guide and it is desirable that the strip should not do so. Thus at the end of the first tray, as shown in FIGURE 2, the Terylene R.T.M. conveyor 126 passes over a supporting bar 141 and then under a bar 142 provided with a stripper plate 143 which, like the stripper plate 146 has a leading edge, of convex profile, resting lightly on the conveyor to peel strip off the conveyor and guide it over the top of the bar 142. The conveyor then rises to withdraw the strip from the liquid, and passes over a roller 144. At this point the strip is transferred to the Terylene R.T.M. conveyor of the second tray, the entry end of this conveyor being raised above the level of the second tray and passing round a roller 145. At the point where the Terylene R.T.M. conveyor deviates from a downward path to a horizontal path a stripper plate 146 is provided as in FIGURE 1. A similar arrangement of conveyors is employed at each transfer from one tray to the next.

FIGURE 2 also shows a pipe 154 permitting liquid to flow from the second tray to the first. One end of this pipe opens out of the side of the second tray near the end where the strip enters it, and its other end opens above the adjacent end of the first tray. It is connected to the latter in such a way that it is free to move horizontally to allow for expansion of the very long trays, and in addition it can be adjusted vertically to control the level of the liquid in the second tray.

Upstream from the outlet in the second tray a baffle 157 extends across the tray. This baffle extends from above the liquid surface to leave a small gap between it and the bottom of the tray. This ensures that the liquid flowing to the outlet is taken from the whole width of the tray and from the lowest stratum of the liquid where the most concentrated solution is likely to collect.

Figure 3:
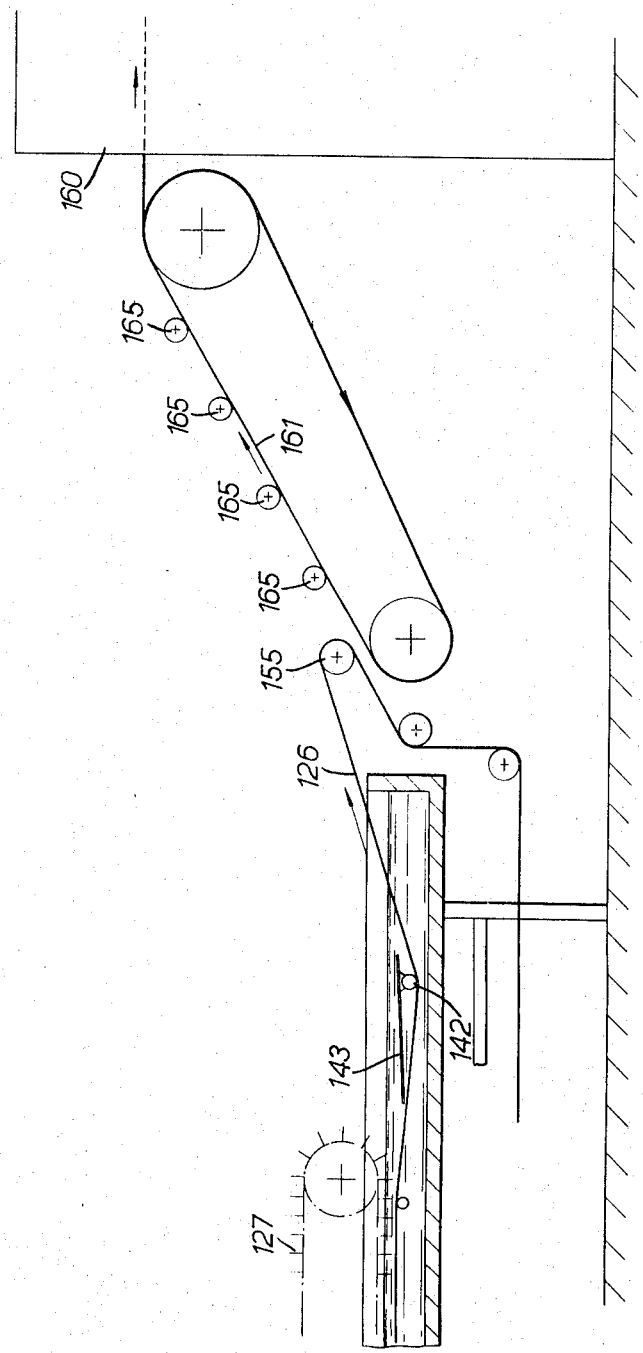
FIGURE 3 is a similar view showing the strip leaving the last leaching tray.

In the last tray, as indicated in FIGURE 3, the brush conveyor 127 terminates several feet from the outlet end so that the strip floats freely on the surface of the leaching liquid, being picked up again eventually by the Terylene R.T.M. conveyor 126 only as this emerges from the tray. By this means the strip is free to assume its natural dimensions and become thermally stabilized. Here the conveyor 126 is extended round and end roller 155 which lies above a sloping conveyor 161 which carries the strip up into a drying oven 160.

In each tank the brush conveyor is arranged so that the brushes only contact the strip when they are lying in a completely vertical plane since the ends of the bristles of the portions curving round at the ends of the conveyor will be travelling at a higher velocity and would tend to bunch up the strip.

Figure 4:
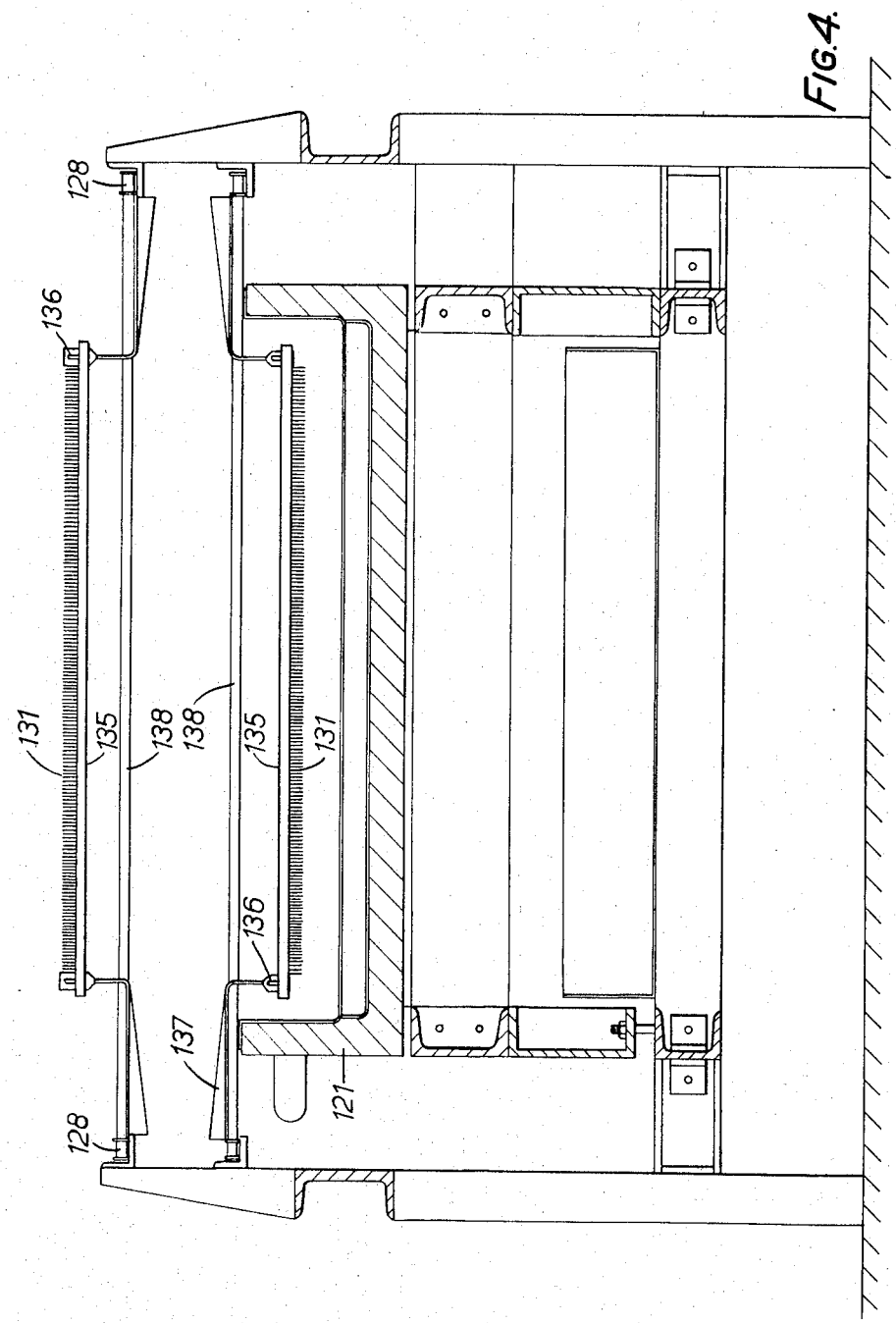
FIGURE 4 is a diagrammatic sectional end elevation of a leaching tray showing the details of the brush conveyor.

As shown in FIGURE 4 the brush bristles are mounted in metal brush backs 135. These are connected by pin and slot connections 136 to L shaped supports 137 secured to the links of the chain 128. Certain of the links of one chain 128 are connected by bars 138 to corresponding links of the other chain to prevent the chain from twisting.

Thus when the chain conveyor is returning the brushes in the inverted position the weight of each brush back causes the brush to rest at the inner end of the longitudinal slot in the support as shown in FIGURE 4. When a brush comes to the rollers at the end of the conveyor and begins to rotate round the roller, the brush tends to slide to the outer end of the slot but is prevented from so doing by a pair of skid bars 139 (shown in FIGURE 2) arranged in the form of a quadrant with which the brush back engages. Only when the brush back drops off the ends of the skid bars is the brush able to slide to the outer end of the slot and thus rest in full contact with the strip of working material. The point at which the brush back drops off the skid bar, thus sliding to the outer end of the slot and so engaging the strip of working material, is arranged to be after the supports have once more taken up a completely vertical position. This ensures that the working material is only held between the brush and the lower Terylene R.T.M. fabric conveyor 126 when the two are travelling at the same linear speed.

The arrangement of the brush being able to slide in its supports ensures that the pressure of the bristles on the strip corresponds to the weight of the brush and is substantially independent of variations of dimensions such as the length of the bristles, the spacing between the chains and the Terylene R.T.M. band, and the thickness of the strip. The brush conveyor presses the strip down into the liquid and holds it in contact with the Terylene R.T.M. conveyor so as to prevent it from crinkling or creasing.

In the specific embodiment the bristles are made of polypropylene and are ¾ of an inch long and 10 thousandths of an inch thick. In general the length of the bristles is chosen to give the desired resiliency under the conditions in which the conveyor is used.

Figure 5:
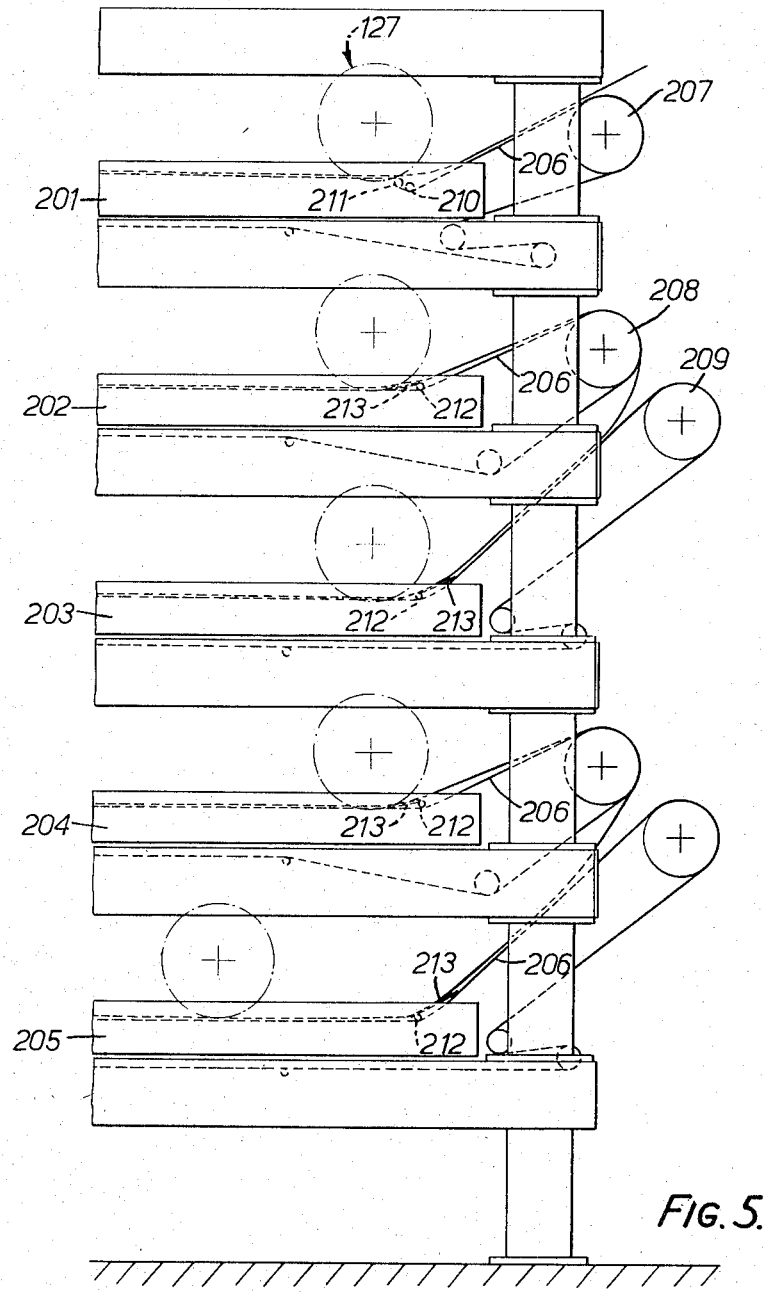
FIGURE 5 is a diagrammatic sectional side elevation of a modified arrangement in which the trays are arranged one above the other.

FIGURE 5 shows one end of a modified arrangement which is analagous to that of FIGURES 1 to 4 except that there are five trays 201 to 205 arranged one above the other, thus effecting a considerable economy of floor space. The strip is passed through these trays in a zigzag fashion, that is to say forward through the top tray, back through the next tray, forward through the third tray, and so forth. Water is pumped through the trays in counter current with the strip, the solution being pumped from the bottom tray to the fourth tray, thence to the third tray, thence to the second tray, and thence to the top tray, whence the concentrated solution is delivered to a recovery plant in which the ammonium sulphate is recovered from it by evaporation.

At the entry to the top tray the lower Terylene R.T.M. conveyor 206 is extended towards the solvent removal oven round an end roller 207 so as to be in line with a conveyor emerging from the latter so that the material passes in a straight line from the oven down into the first tray. Here it is rapidly wetted and becomes flexible and quite weak.

At the end of each tray as shown in connection with the second and fourth trays 202 and 204 the Terylene R.T.M. conveyor rises to withdraw the strip from the liquid and passed over a roller 208. At this point the strip is transferred to the Terylene R.T.M. conveyor of the second tray the entry end of this conveyor being raised above the level of the second tray round a roller 209.

It will be appreciated that the surface of the strip that was uppermost in the first tray is underneath in the second tray. A similar arrangement of conveyors is employed at each transfer from one tray to the next.

In the lowest tray the brush conveyor terminates several feet from the outlet and so that the strip floats freely on the surface of the leaching liquid, being picked up again eventually by the Terylene R.T.M. conveyor only, as this emerges from the tray. By this means the strip is free to assume its natural dimensions and become thermally stabilized.

From the bottom or fifth tray of the leaching unit, the strip may pass up an inclined conveyor to the drying oven as in the arrangement of FIGURES 1 to 4.

As in the arrangement of FIGURES 1 to 4, at points where the Terylene R.T.M. conveyor deviates from a downward path to a horizontal path or from a horizontal path to an upward path it has to pass under a roller or other guide and it is desirable that the strips should not do so.

One arrangement for separating the strip from the conveyor, shown in connection with the first tray 204 is to cause the conveyor to pass first one roller or bar 210 and then over a second roller or bar 211 which takes it in a small detour away from the strip, and then horizontally so that a short length of the strip is unsupported but hangs in a gentle curve, rejoining the horizontal portion of the conveyor just before the beginning of the brush.

This may be satisfactory where the dry strip enters the first bath but in some circumstances at other points the wet limp strip may tend to adhere to the conveyor and accompany it round the rollers. Thus at other points an alternative arrangement is adopted similar to that of FIGURES 1 to 4 in which the conveyor merely passes under a single guide bar 212 which is provided with a skid blade 213 having a convex leading edge, resting lightly on the conveyor, to peel the strip off the conveyor and guide it over the top of the guide bar.

As in the arrangement of FIGURES 1 to 4, each brush conveyor 127 is arranged so that the brushes only contact the strip when they are lying in a completely vertical plane since the portions of the brushes curving round at the ends of the conveyor will be travelling at a higher velocity and would tend to bunch up the strip.

The fact that when the chain conveyor is returning the brushes in the inverted position the weight of the brush back causes each brush to rest at the inner end of the longitudinal slot in the support, allows of some space saving in the assembly of FIGURE 5.

In either of the arrangements described the strip and the liquid flow in counter flow as regards the order in which they pass through the various trays. That is to say the strip passes through the trays in one order and the liquid passes through them in the reverse order. In addition it is generally desirable that the strip and the liquid should pass through each individual tray in counterflow, and to this end the trays are connected as described in connection with FIGURE 2.

The purpose of this may, however be partially defeated by the stirring action of the conveyors. To overcome this difficulty one or more baffles or perforated weirs (not shown) may be provided extending across a tray at one or more intermediate points in its length. Each baffle extends upon slightly above the surface of the liquid and has a smooth top over which the lower conveyor band rides. Thus the strip rises temporarily out of the liquid at each point where it passes over a baffle. The baffles do not prevent a steady flow of liquid from one end of the tray to the other but prevent mixing of the liquid throughout the length of the tray, so that the concentration of salt in it can be substantially greater at one end than at the other.

It will be appreciated that an advantage of conveying apparatus according to the present invention is that since a positive grip is maintained on the article being conveyed the system can handle separate articles and does not require to be threaded by hand. This is especially useful in continuous processes and where fragile materials are being handled since a break in the continuous strip does not necessitate re-threading, and thus does not interrupt production. In the particular process described, moreover, a re-threading operation would be particularly time consuming as the conditions obtaining in the leaching unit are unfavourable to manual re-threading.

A further advantage of the positive grip is that the conveyor can be run in any orientation and does not require to be substantially horizontal as is the case in conveyor systems employing a single conveyor on which the conveyed article rests, and in which adhesion between the conveyor and the article depends solely on the weight and nature of the article. If desired the brushes may be acted on by springs to keep them in contact with the strip.

What we claim as our invention and desire to secure by Letters Patent is:

1. Conveying apparatus for a fragile strip material including a companion conveyor comprising an endless band of sheet material, an endless band of brushes having soft bristles opposed to the band conveyor to hold the strip material in contact with the endless band conveyor, and means for driving the two conveyors at the same linear speed to carry the material with them, in which the brushes are carried by supporting means of endless band form by connections permitting each brush to move independently away from the position of the strip material to a retracted position in response to pressure on the bristles, the brushes being biased towards the strip.

2. Apparatus as claimed in claim 1 in which the brushes are located so as to be biased by gravity towards the strip.

3. Apparatus as claimed in claim 1 in which the band of brushes includes a straight portion and the path of the bristles and the path of the strip are such that the bristles engage the strip along a part of the straight portion but are out of contact with the strip at the ends of the straight portion where it meets curved portions.

4. Apparatus as claimed in claim 3 including means to hold each brush in the retracted position as it passes round a curved portion of the brush conveyor adjacent an end of a straight portion, and to be released to contact the strip only when the peripheral speed of the bristle tips will tend to be equal to that of the companion conveyor.

5. Conveying apparatus for conveying a fragile strip material through a liquid, including a bath for the liquid, a companion conveyor comprising an endless band of sheet material passing through the bath, an endless band of brushes having soft bristles opposed to the band conveyor to hold the strip material in contact with the endless band conveyor, and means for driving the two conveyors at the same linear speed.

6. Apparatus as claimed in claim 5 in which at a point where the companion conveyor deviates upwards it is guided by passing under a guide such as a transverse bar, and means is provided for temporarily separating the strip from the companion conveyor and causing it to pass over the guide.

7. Apparatus as claimed in claim 6 in which the companion conveyor band is passed over a guide and then under a lower guide so as to cause it to make a detour whilst the strip material can continue directly over the latter guide.

8. Apparatus as claimed in claim 6 in which the means for causing the strip material to pass over the guide comprises a stripper plate projecting between the strip material and the companion conveyor band to deflect the former away from the latter and over the guide.

9. Apparatus as claimed in claim 5 including a series of two or more trays, each including a brush conveyor, through which the strip is arranged to pass successively in one order while the liquid passes through them in the reverse order.

10. Apparatus as claimed in claim 9 including at least two trays at different levels in which the strip is arranged to travel from the lower tray to the higher tray while liquid flows down from the higher tray to the lower tray.

11. Apparatus as claimed in claim 5 in which the strip material and the liquid are arranged to travel in opposite directions in an individual bath or tray.

12. Apparatus as claimed in claim 5 in which the bath comprises a series of trays arranged one above the other.

13. Apparatus as claimed in claim 12 in which the strip follows a zig-zag path through successive trays and is inverted between one and another.

14. Apparatus as claimed in claim 5 in which the treating liquid undergoes an increase of density and at the outlet end of a tray a baffle is provided extending across it from above the liquid surface but have at least one opening adjacent the bottom of the tray to allow the lower stratum only of the liquid to pass to the outlet.

References Cited
UNITED STATES PATENTS

| | | | |
|---|---|---|---|
| 664,860 | 1/1901 | Hensley | 15—77 X |
| 2,583,183 | 1/1952 | Marvin et al. | 134—60 X |
| 2,684,681 | 7/1954 | Wallerius et al. | 134—127 |
| 2,721,562 | 10/1955 | Irvine | 134—60 |
| 2,989,764 | 6/1961 | Peterson | 15—77 |
| 3,100,564 | 8/1963 | Levy | 198—165 |

CHARLES A. WILLMUTH, *Primary Examiner.*

R. L. BLEUTGE, *Assistant Examiner.*